(12) United States Patent
Lee et al.

(10) Patent No.: US 7,733,628 B2
(45) Date of Patent: Jun. 8, 2010

(54) MULTILAYER CHIP CAPACITOR

(75) Inventors: Byoung Hwa Lee, Gyunggi-do (KR); Sung Kwon Wi, Seoul (KR); Hae Suk Chung, Seoul (KR); Dong Seok Park, Seoul (KR); Sang Soo Park, Gyunggi-do (KR); Min Cheol Park, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 148 days.

(21) Appl. No.: 12/005,300

(22) Filed: Dec. 27, 2007

(65) Prior Publication Data

US 2008/0180879 A1 Jul. 31, 2008

(30) Foreign Application Priority Data

Jan. 31, 2007 (KR) .................. 10-2007-0009913

(51) Int. Cl.
*H01G 4/228* (2006.01)
*H01G 4/06* (2006.01)

(52) U.S. Cl. .................... 361/306.3; 361/311

(58) Field of Classification Search ........... 361/303, 361/306.1, 306.3, 308.1, 309, 311
See application file for complete search history.

(56) References Cited

U.S. PATENT DOCUMENTS

| | | | |
|---|---|---|---|
| 5,880,925 A | 3/1999 | DuPre et al. | |
| 6,266,228 B1 * | 7/2001 | Naito et al. | ............ 361/306.1 |
| 6,972,942 B2 | 12/2005 | Ritter et al. | |
| 7,068,490 B2 | 6/2006 | Prymak | |
| 7,092,236 B2 | 8/2006 | Lee et al. | |

FOREIGN PATENT DOCUMENTS

| | | |
|---|---|---|
| JP | 2000-208361 | 7/2000 |
| JP | 2000-323354 | 11/2000 |
| JP | 2001-155953 | 6/2001 |
| JP | 2004-119798 | 4/2004 |
| JP | 2004-342846 | 12/2004 |

OTHER PUBLICATIONS

Notice of Information Provision, with English Translation, issued in the Corresponding Japanese Patent Application No. JP 2007-333252 dated Nov. 28, 2008.
Korean Office Action, with English Translation issued in Korean Patent Application No. KR 10-2007-009913 dated on Apr. 30, 2008.
Japanese Office Action, with English Translation, issued in Japanese Patent Application No. 2007-333250, dated Dec. 22, 2009.

* cited by examiner

*Primary Examiner*—Eric Thomas
(74) *Attorney, Agent, or Firm*—McDermott Will & Emery LLP

(57) ABSTRACT

A multilayer chip capacitor including: a capacitor body having a plurality of dielectric layers deposited therein and having a parallelepiped shape; at least three pairs of first and second external electrodes formed on two longer sides, the first and second external electrodes in each of the pairs having different polarities and opposing each other, and the first and second external electrodes on each of the longer sides arranged alternately with each other; and a plurality of first and second internal electrodes arranged alternately to interpose each of the dielectric layers, the first and second internal electrodes connected to the first and second external electrodes by leads, respectively, wherein the capacitor body has a length that is 2.5 times greater than a width thereof.

6 Claims, 8 Drawing Sheets

MULTILAYER CHIP CAPACITOR

CROSS-REFERENCE TO RELATED APPLICATIONS

This application claims the priority of Korean Patent Application No. 2007-09913 filed on Jan. 31, 2007, in the Korean Intellectual Property Office, the disclosure of which is incorporated herein by reference.

BACKGROUND OF THE INVENTION

1. Field of the Invention

The present invention relates to a multilayer chip capacitor, more particularly, which can be reduced in size and equivalent series inductance (ESL).

2. Description of the Related Art

In general, a multilayer chip capacitor has internal electrodes of different polarities deposited alternately to interpose each of dielectric layers. This multilayer chip capacitor advantageously ensures a smaller size, a higher capacity and easy mountability on a circuit board, thus widely used as a capacitive component of various electronic devices. Especially, the multilayer chip capacitor is considerably utilized as a decoupling capacitor for stabilizing a high frequency power circuit for use in e.g., a micro-processor unit (MPU). To be employed as a decoupling capacitor of the MPU, the capacitor should have a low ESL. This demand for a lower ESL has been rising due to a higher speed of the MPU and a resultant higher power and lower voltage trend.

To be employed in an MPU package, decoupling capacitors need to be connected in parallel to lower impedance of a power network. Here, a greater number of the decoupling capacitors with a smaller size should be connected in parallel to achieve lower impedance due to a limited mounting area. Even though the decoupling capacitors are smaller-sized, that is, a greater number of capacitors are connected in parallel in a limited mounting area, the smaller-sized capacitors may achieve less decline in overall impedance when each of the capacitors is increased in an ESL. Therefore, to reduce size of the decoupling capacitors, it is of great importance to keep an ESL of the each capacitor at an identical or lower level compared to a non-downscaled capacitor.

FIG. 1A is a schematic perspective view illustrating a conventional multilayer chip capacitor and FIG. 1B is a side cross-sectional view illustrating the conventional multilayer chip capacitor.

Referring to FIGS. 1A and 1B, the multilayer chip capacitor 10 includes a capacitor body 11 having a plurality of dielectric layers deposited therein. First or second internal electrodes 12 and 13 are formed on each of the dielectric layers. The first and second internal electrodes 12 and 13 are disposed to oppose each other while interposing the each dielectric layer. Thus, the first and second internal electrodes 12 and 13 are connected to first and second external electrodes 14 and 15 of different polarities formed on end faces of the capacitor body 11. Generally, each the external electrodes 14 and 15 has an extending portion A partially extended to a top and bottom and sides adjacent to the end faces.

This multilayer chip capacitor 10, as illustrated in an equivalent circuit diagram of FIG. 1C, has an equivalent series inductance (ESL) resulting from current loop in the capacitor and an equivalent series resistance (ESR) resulting from dielectric loss and electrode resistance, in addition to its intended capacitance C. This two-terminal capacitor is too high in an ESL to be used as a high-performing decoupling capacitor for a high frequency circuit.

Recently, a multi-terminal multilayer chip capacitor such as an eight-terminal capacitor has been suggested as a decoupling capacitor. For example, U.S. Pat. No. 5,880,925 assigned to AVX Corporation discloses an eight-terminal multilayer chip capacitor in which leads of internal electrodes of different polarities are arranged interdigitatedly, and also a plus (+) external terminal and a minus (−) external terminal are arranged alternately to cancel out magnetic fluxes generated by high frequency currents, thereby decreasing the ESL. In general, a greater number of electrodes (terminals) further reduce the ESL, but during a current process of forming the external electrodes, four terminals are arranged on one side (longer side) of the capacitor body. The eight-terminal capacitor with a 1680 size, which adopts the AVX structure, has an ESL of approximately 60 pH.

As described above, to lower overall impedance, a greater number of smaller multi-terminal capacitors should be connected in parallel in a limited mounting area. In a case where the AVX-suggested capacitor structure is reduced from a 1608 size (a length of 1.6 mm and a width of 0.8 mm) to a 1005 size (a length of 11.0 mm and a width of 0.5 mm), only three terminals may be arranged on one longer side face due to limitation associated with the formation process of the external electrodes. Therefore, the capacitor structure, when reduced from a 1608 size to a 1005 size, is expected to adopt a six-terminal capacitor. Here, the six-terminal capacitor with a 1005 size has a smaller number of terminals than an eight-terminal capacitor with a 1608 size, and thus is increased in an ESL to approximately 75 pH. Accordingly, the plurality of capacitors connected in parallel lead to less decrease in total inductance. In consequence, such reduction in size of the capacitor requires a smaller number of external terminals, which however subsequently increases the ESL of each of the capacitors.

SUMMARY OF THE INVENTION

An aspect of the present invention provides a multilayer chip capacitor in which each of capacitors is reduced in size and then further decreased in an ESL to lower total inductance more effectively.

According to an aspect of the present invention, there is provided a multilayer chip capacitor including: a capacitor body having a plurality of dielectric layers deposited therein and having a parallelepiped shape; at least three pairs of first and second external electrodes formed on two longer sides, the first and second external electrodes in each of the pairs having different polarities and opposing each other, and the first and second external electrodes on each of the longer sides arranged alternately with each other; and a plurality of first and second internal electrodes arranged alternately to interpose each of the dielectric layers, the first and second internal electrodes connected to the first and second external electrodes by leads, respectively, wherein the capacitor body has a length that is 2.5 times greater than a width thereof.

The capacitor body may have a length that is at least 2.5 times and up to 7 times a width thereof.

The capacitor body may have a length that is at least 1.1 mm and up to 1.6 mm.

The capacitor body may have a width that is at least 0.2 mm and up to 0.5 mm.

The first and second external electrodes of an identical number may be formed on the respective longer sides. Four pairs of first and second external electrodes may be formed on the longer sides to constitute an eight-terminal capacitor.

The first and second external electrodes of a different number may be formed on the respective longer sides. Three pairs of first and second external electrodes may be formed on the longer sides to constitute a six-terminal capacitor. A greater number of external electrodes, e.g., five or six electrodes may be formed on the respective longer sides to constitute a capacitor with a greater number of terminals, e.g., ten or twelve terminals.

In the specification, a length in a longer axis direction of a capacitor body (X direction, see FIG. 2), i.e., length of a longer side, is defined as a length (L) of the capacitor body, and a length in a shorter axis direction of a capacitor body (Y direction, see FIG. 2), i.e., length of a shorter side is defined as a width of the capacitor body.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1A:
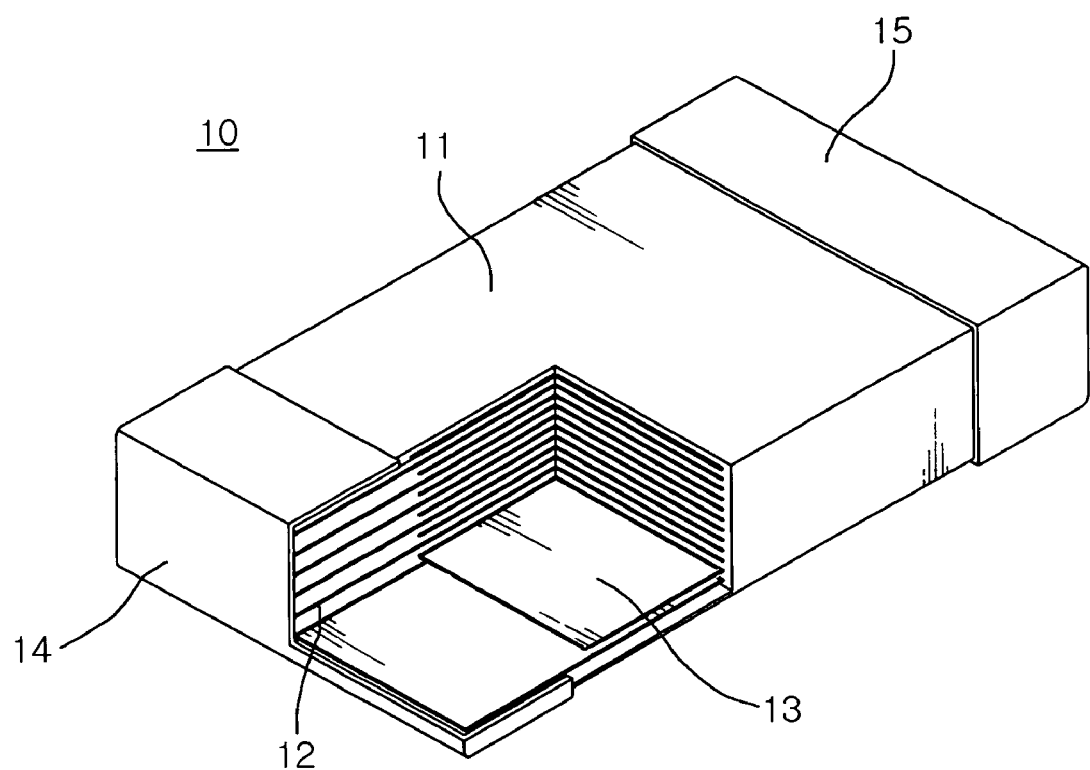
FIGS. 1A to 1C illustrate a conventional multilayer chip capacitor, in which A is a perspective view, B is a cross-sectional view and C is an equivalent circuit diagram.
Figure 1B:
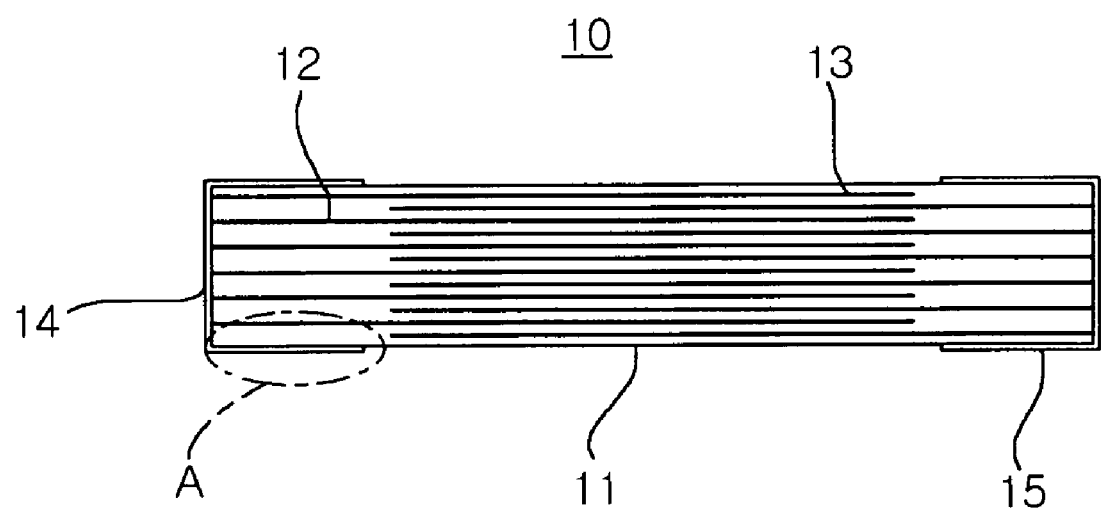
Figure 1C:
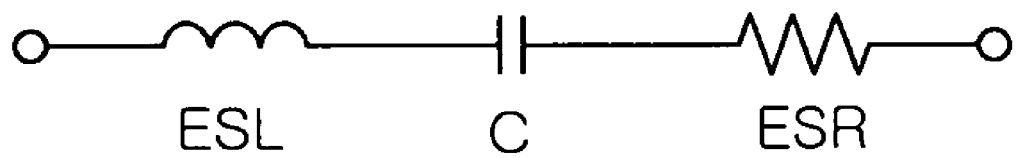
Figure 2:
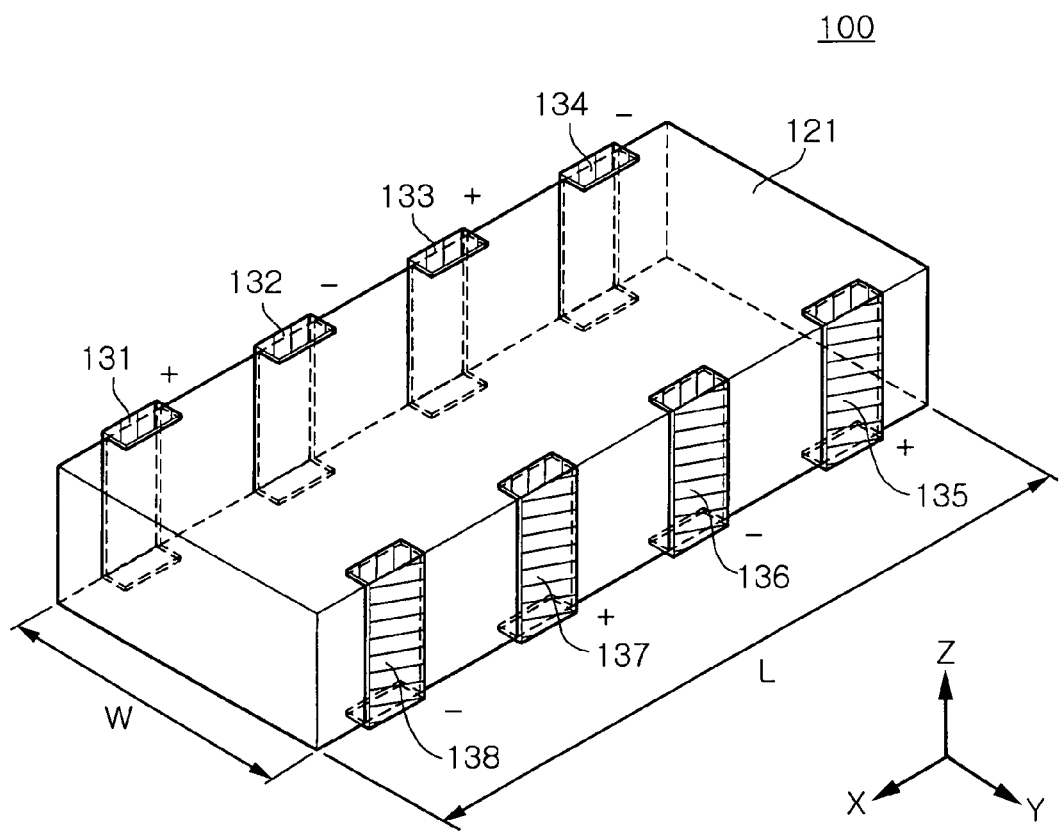
FIG. 2 is a perspective view illustrating a multilayer chip capacitor according to an exemplary embodiment of the invention.

Exemplary embodiments of the present invention will now be described in detail with reference to the accompanying drawings. FIG. 2 is a perspective view illustrating a multilayer chip capacitor according to an exemplary embodiment of the invention. Referring to FIG. 2, the multilayer chip capacitor 100 of the present embodiment includes a capacitor body 121 having a plurality of dielectric layers multilayer deposited therein. The capacitor body 121 is parallelepiped-shaped, and has top and bottom surfaces, two opposing shorter sides and two opposing longer sides. A plurality of first and second internal electrodes (see FIG. 3) are arranged inside the capacitor body 121 to oppose each other, while interposing each of the dielectric layers.

First external electrodes 131, 133, 135, and 137 and second external electrodes 132, 134, 136, and 138 are formed on the opposing longer sides. The first and second external electrodes of different polarities are arranged alternately on each of the longer sides. Also, the external electrodes of different polarities are formed in pairs to oppose each other on the longer sides. Therefore, the first external electrode, e.g, 131 disposed on one side faces the second external electrode, e.g., 132 disposed on the opposite side. Particularly, according to the present embodiment, the first two external electrodes and the second two external electrodes are arranged i.e., in an identical number on the respective longer sides. Thus, four pairs of first and second external electrodes are formed on the longer sides of the capacitor body to constitute an eight-terminal multilayer chip capacitor. The internal electrodes inside the capacitor body are connected to the external electrodes 131 to 138 via leads to have polarities identical to those of the connected external electrodes 131 to 138 (see FIG. 3).

The external electrodes 131 to 138 may be partially extended to a top and bottom abutting the longer sides of the capacitor body 121. Extending portions of the external electrodes may be formed in a process where the external electrodes are applied. Notably, the extending portions of the external electrodes partially formed on the bottom of the body 121 may be brought in contact with mounting pads on the circuit board when the capacitor is mounted thereon. However, the external electrodes do not necessarily have the extending portions and may be formed only on the longer sides.

The inventors reduced the longer sides of the capacitor relatively less than shorter sides, and defined a form factor, i.e., a ratio of length L to width W of the capacitor body to be within a predetermined range. That is, the inventors learned that the ratio of length L to width W of the capacitor body, when defined to be within a predetermined range, ensures a smaller-sized capacitor and a lower ESL of individual capacitors. According to the present embodiment, the capacitor does not need to have a smaller number of external terminals even if reduced in size and mutual inductance is cancelled out maximally. This allows the capacitor to be reduced in size and ESL.

As shown in FIG. 2, the capacitor body 21 has a length L that is at least 2.5 times a width W thereof. A greater ratio (L/W) of length to width of the capacitor body 121 is beneficial for reducing the number of terminals. This however shortens a length of a shorter side, i.e., width W of the capacitor, in miniaturizing the capacitor, thereby rendering the external electrodes of different polarities more likely to be shorted to each other. Therefore, the capacitor body may have a ratio of length to width (L/W) that is 2.5 to 7.

Moreover, to realize an eight-terminal capacitor with a smaller size than the eight-terminal capacitor with a 1608 size in current use, the capacitor body may have a length L of at least 1.1 mm and up to 1.6 mm. A smaller-sized eight-terminal capacitor may be achieved by additionally defining the width of the capacitor to be within a predetermined range. That is, the width W of the capacitor body may be adjusted to at least 0.2 mm and up to 0.5 mm, thereby implementing an eight-terminal capacitor smaller than a 1608 size.

As described above, the ratio (L/W) of length to width of the capacitor body, when set to at least 2.5, allows external electrodes of a sufficient number to be formed on each of the longer sides, without a need for reducing the number of the external electrodes. Even though the multilayer chip capacitor is reduced from a 1680 size (area of 1.28 mm$^2$) to a smaller size, e.g., area of 0.5 mm$^2$, the longer sides may have a sufficient length so that the four external electrodes are formed on each of the longer sides. This enables the eight-terminal multilayer capacitor with a size having an area of 0.5 mm$^2$ (compare with a 1005 size having an L/W of 2). For example, in a case where a capacitor with a 1680 size is reduced to a size of 1.25×0.4 mm$^2$ (L/W=2.5), the four external electrodes may be formed easily on the respective longer sides, accordingly realizing the eight-terminal capacitor having an area reduced in half or less.

As shown in FIG. 2, the external electrodes of different polarities arranged alternately and adjacent to each other on the respective longer sides cancel magnetic fluxes induced by currents flowing through adjacent ones e.g., 131 and 132 of the external electrodes with different polarities, thereby resulting in cancellation of mutual inductance. This consequently lowers ESL of the capacitor. Therefore, as long as is permitted by processes of forming the external electrodes and mounting the capacitor, the adjacent external electrodes of different polarities, when less spaced from each other on the identical side contribute more to reducing ESL.

As described later, the cancellation of mutual inductance can be achieved by not only arrangement of the external terminals but also by an internal structure of the capacitor body. The cancellation of mutual inductance inside the capacitor body is associated with the ratio of length to width L/W.

FIG. 3 is a plan view illustrating internal electrode structures of the multilayer chip capacitor of FIG. 2 and current paths (indicated with arrows) inside the capacitor. Internal electrodes 122 and 123 of different polarities are arranged to oppose each other, while interposing each of dielectric layers 121*a* and 121*b*. This pair of two internal electrodes is repeatedly deposited inside the capacitor body.

Figure 3A:
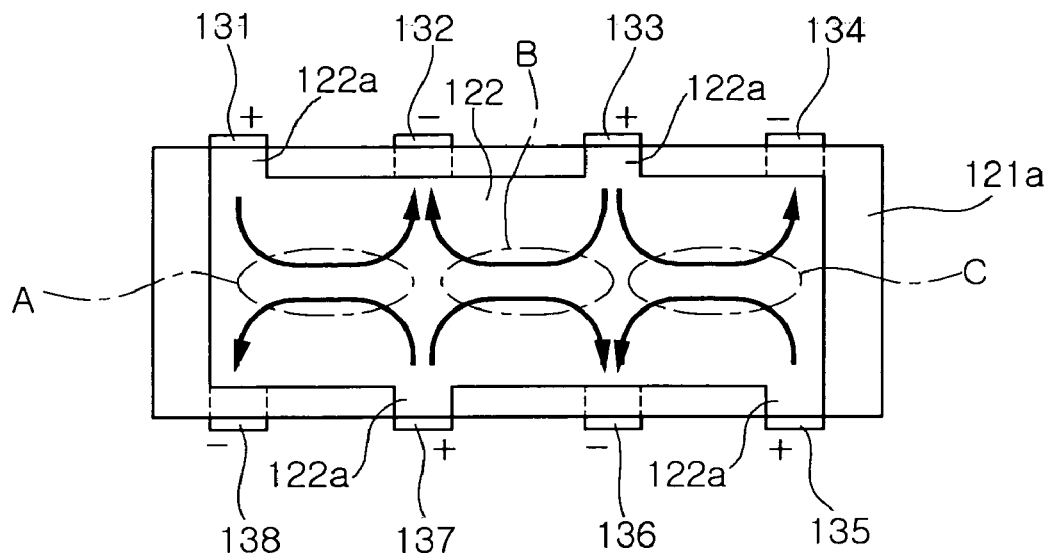
FIGS. 3A and 3B are schematic plan views illustrating an internal electrode structure of the multilayer chip capacitor shown in FIG. 2 and current paths flowing through the capacitor.
Figure 3B:
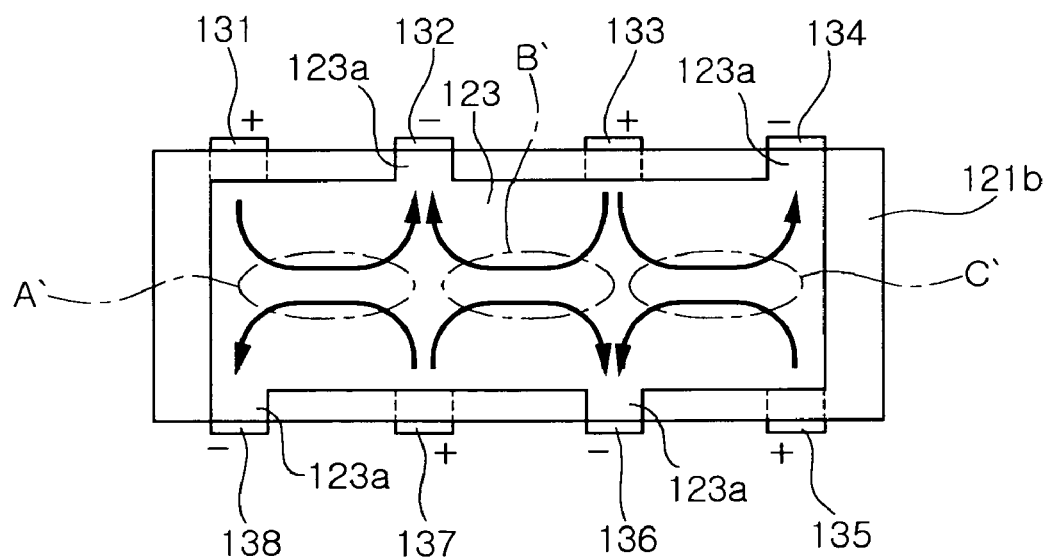

Referring to FIGS. 3A and 3B, the first internal electrode 122 (e.g., plus polarity) formed on the dielectric layer 121*a* is electrically connected to the first external electrodes 131, 133, 135 and 137 by a lead 122*a*. Also, a second internal electrode 123 of another polarity (minus polarity) formed on the dielectric layer 121*b* is electrically connected to the second external electrodes 132, 134, 136, and 138 by a lead 123*a*. As shown in FIGS. 3A and 3B, the internal electrodes and external electrodes arranged and configured according to the present embodiment effectively cancel magnetic fluxes generated by currents flowing through internal electrodes inside the capacitor body, thereby further reducing ESL. As indicated with arrows of FIGS. 3A and 3B, current flowing through the internal electrodes flows from a plus external electrode to the most adjacent minus external electrode due to its tendency of flowing on a shortest path. When the capacitor body has a ratio L/W of length L to width W that is at least 2.5, the external electrodes of different polarities, when arranged alternately on each of the longer sides and facing each other on the opposite longer sides, effectively cancel magnetic fluxes induced by current paths inside the capacitor body.

In a detailed description, as shown in FIG. 3, current paths of the internal electrodes are formed such that a current flows from a plus external electrode 131 to a minus external electrode 132, a current flows from a plus external electrode 133 to a minus external electrode 132, a current flows from a plus external electrode 137 to a minus external electrode 138, a current flows from a plus external electrode 137 to a minus external electrode 136, respectively. Further, current paths of the internal electrodes are formed such that a current flows from a plus external electrode 133 to a minus external electrode 134, and a current flows from a plus external electrode 135 to a minus external electrode 136, respectively.

Therefore, in areas A, B and C of the first internal electrodes and in areas A', B', and C' of the second internal electrodes, magnetic fluxes induced by currents flowing in opposite directions are effectively canceled out. This as a result easily eliminates or cancels mutual inductance induced by currents flowing in opposite directions inside the capacitor body. This further reduces ESL of the capacitor. The mutual inductance is effectively canceled inside the capacitor body when a ratio L/W of length to width of the capacitor body is at least 2.5, particularly at least 2.5 and up to 7. That is, when the capacitor body has a ratio of width W to length L that is 1/2.5, cancellation of magnetic fluxes is effectively increased in the areas A, B, C, and A', B', C'. Therefore, in terms of cancellation of magnetic fluxes inside the capacitor body, i.e., for better ESL, a smaller width W of the capacitor body than a length L may be beneficial. The ratio L/W of length to width that is smaller than 2.5 does not ensure sufficient cancellation of magnetic fluxes inside the capacitor body, thereby not bringing in sufficient reduction in ESL or even increasing the ESL.

According to the present embodiment, each of the internal electrodes 122 and 123 has four leads, but the present invention is not limited thereto. The internal electrode 122 or 123 may have at least one lead. For example, even though the multilayer chip capacitor is an eight-terminal capacitor, the internal electrode may have only one lead. Here, the internal electrodes of each polarity may have four different types of electrode patterns depending on location of the leads, and the leads of the internal electrodes adjacent to each other in a depositing direction may be connected to the external electrodes adjacent to each other, respectively.

FIG. 4 is a perspective view for comparing conventional multilayer chip capacitors with a multilayer chip capacitor according to an exemplary embodiment of the invention.

Figure 4A:
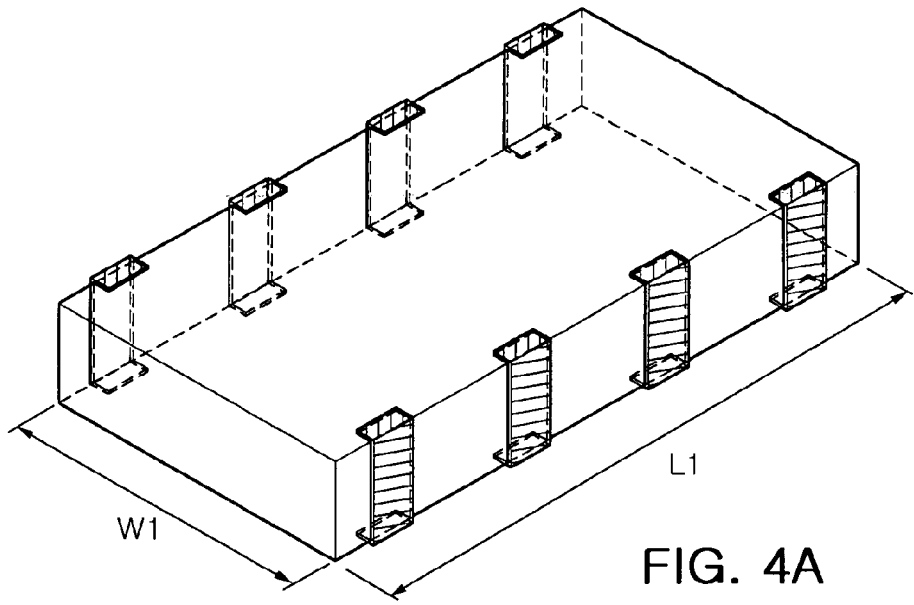
FIGS. 4A to 4C are perspective views for comparing conventional multilayer chip capacitors with a multilayer chip capacitor according to an exemplary embodiment of the invention.
Figure 4B:
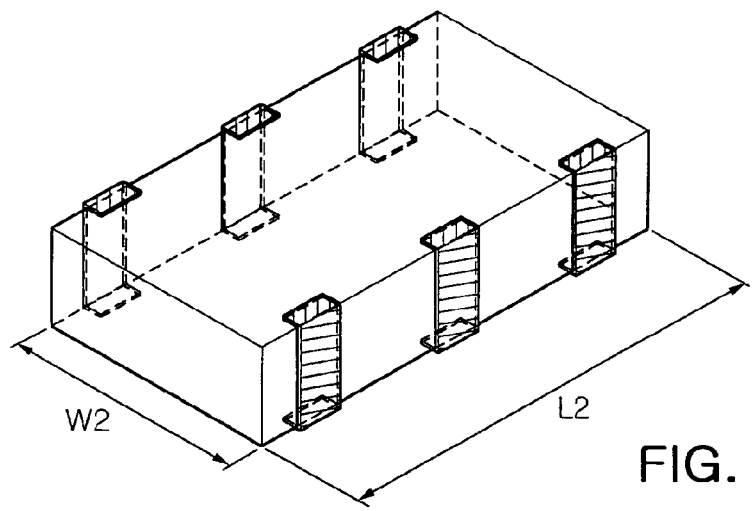
Figure 4C:
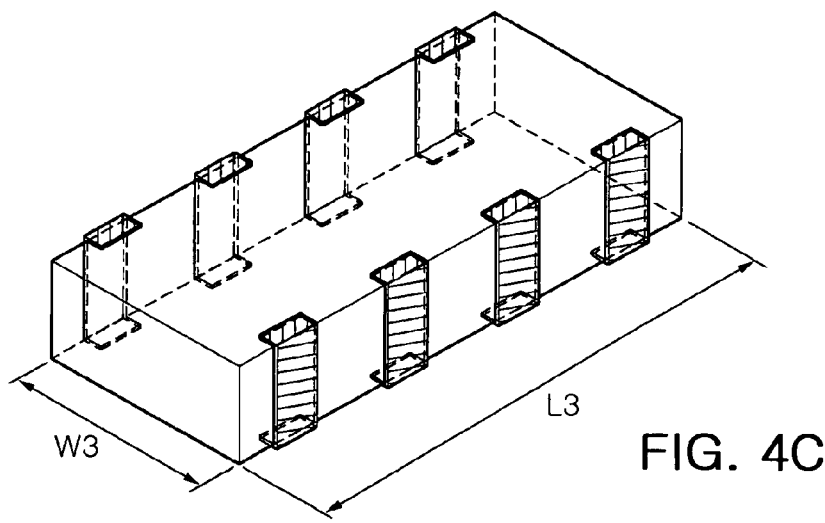

The multilayer chip capacitors shown in FIGS. 4A to 4C have ratios (L/W) of length to width varied. In capacitor bodies of FIGS. 4A to 4B, first and second internal electrodes of different polarities are formed on each of dielectric layers. The first and second internal electrodes are arranged to oppose each other, while interposing the each dielectric layer and connected to first and second external electrodes, respectively. To be connected to the first external electrodes, the first internal electrodes have leads extended to longer sides of the capacitor body, respectively. Likewise, to be connected to the second external electrodes, the second internal electrodes have leads extended to the longer sides of the capacitor body, respectively.

FIG. 4A illustrates the conventional multilayer chip capacitor with a 1608 size. Accordingly, the multilayer chip capacitor of FIG. 4A has a capacitor body having a length $L_1$ of 1.6 mm, and $W_1$ of 0.8 mm. Four pairs of external electrodes are formed on opposing longer sides of the capacitor body. Here, plus external electrodes and minus external electrodes are arranged alternately and adjacent to each other on each of the longer sides, and the plus and minus external electrodes are arranged to face each other on the opposing sides.

FIG. 4B is a perspective view illustrating a multilayer chip capacitor with a 1005 size. Therefore, the multilayer chip capacitor of FIG. 4B has a capacitor body with a length $L_2$ of 11.0 mm and a width $W_2$ of 0.5 mm. Due to difficulty in applying the external electrodes, up to three external electrodes may be formed on the each longer side of the capacitor with a 1005 size. Therefore, three pairs of external electrodes are formed on the opposing longer sides of the capacitor of FIG. 4B (six-terminal capacitor). Even though the eight terminal capacitor with a 1005 size is manufactured through technological improvement in the process, this eight-terminal capacitor with a 1005 size, when mounted on a circuit board, including a soldering process between the external electrodes and circuit patterns), is very likely to experience short between the external electrodes of different polarities.

The multilayer chip capacitor with a 1005 size of FIG. 4B has a smaller area than a multilayer chip capacitor with a 1608 size of FIG. 4A. Thus, a greater number of capacitors may be disposed on an identical mounting area of the circuit board, e.g., MPU package and connected in parallel with one another. However, with a decrease in a length of the capacitor body from 1.6 mm to 11.0 mm, a limited number of external electrodes are formed on the longer sides of the capacitor with a 1005 size. Here, when the external electrodes are applied in a general process, only up to three external electrodes may be disposed on the each longer side.

Therefore, compared with the capacitor with a 1608 size, the capacitor with a 1005 size is increased in ESL due to decrease in the number of terminals. Accordingly, even increase in the number of capacitors connected in parallel on an identical mounting area assures less reduction or even increase in total inductance.

However, as shown in FIG. 4C, the capacitor having a ratio (L/W) of length to width that is at least 2.5 is prevented from reduction in ESL, which results from a smaller sized capacitor. According to the present embodiment of FIG. 4C, the capacitor body has a length $L_3$ of 1.25 mm, and a width $W_3$ of 0.4 mm. Also, four pairs of external electrodes are formed on opposing sides of the capacitor body, i.e., to constitute an eight-terminal capacitor.

Referring to FIG. 4C, the capacitor body of the present embodiment is not significantly reduced in length $L_3$ compared to a capacitor with a 1608 size. Therefore, unlike the capacitor with a 1005 size, four terminals may be formed on each of the longer sides of the capacitor body. Moreover, according to the present embodiment, the capacitor body is halved in width $W_3$ to 0.4 mm compared to the capacitor with a 1608 size. As a result, as described with reference to FIG. 3, internal currents flowing in opposite directions from a plus external electrode to an adjacent minus external electrode are drawn closer, thus maximizing cancellation of magnetic fluxes induced by the internal currents, i.e., currents inside the capacitor flowing in opposite directions, as indicated with arrows in FIG. 3 and consequently reducing ESL further.

Example

The inventors conducted experiment for comparing ESL and total inductance of capacitors of each size. Here, the total inductance was obtained by connecting capacitors of as great a number as possible in parallel on a predetermined mounting area.

Table 1 shows results of the experiment, i.e., ESL and total inductance of a capacitor with a 1608 size, a capacitor with 1005 size and a capacitor with a 1.25×0.4 size, respectively. In the experiment, on an identical mounting area where 30 capacitors with a 1608 size could be mounted, an eight-terminal capacitor with a 1608 size (Comparative Example 1), a six-terminal capacitor with a 1005 size (Comparative Example 2) and an eight-terminal capacitor with a 1.25×0.4 size (Inventive Example) were mounted, respectively. Here, on the identical mounting area where 30 capacitors with a 1608 size could be mounted, 60 capacitors with a 1005 size were mounted and 60 capacitors with a 1.25×0.4 size (Inventive Example) were mounted.

TABLE 1

|  | Size(Dimension) | | |
|---|---|---|---|
|  | 1.6 × 0.8 | 1.0 × 0.5 | 1.25 × 0.4 |
| ESL | 60 pH | 75 pH | 50 pH |
| Total Inductance | 2 pH | 1.25 pH | 0.83 pH |

As noted in Table 1, the capacitor with a 1608 size had an ESL of 60 pH and a total inductance (30 capacitors) of 2 pH. The capacitor with a 1005 size had an ESL of 75 pH and a total inductance of 1.25 pH. The capacitor with a 1.25×0.4 size (Inventive Example) exhibited a lower ESL of 50 pH and a very low total inductance of 0.83 pH.

As shown in the experiment and Table 1, according to Inventive Example, a great number of capacitors can be mounted on an identical mounting area. Also, individual capacitors mounted are further decreased in ESL.

Figure 5:
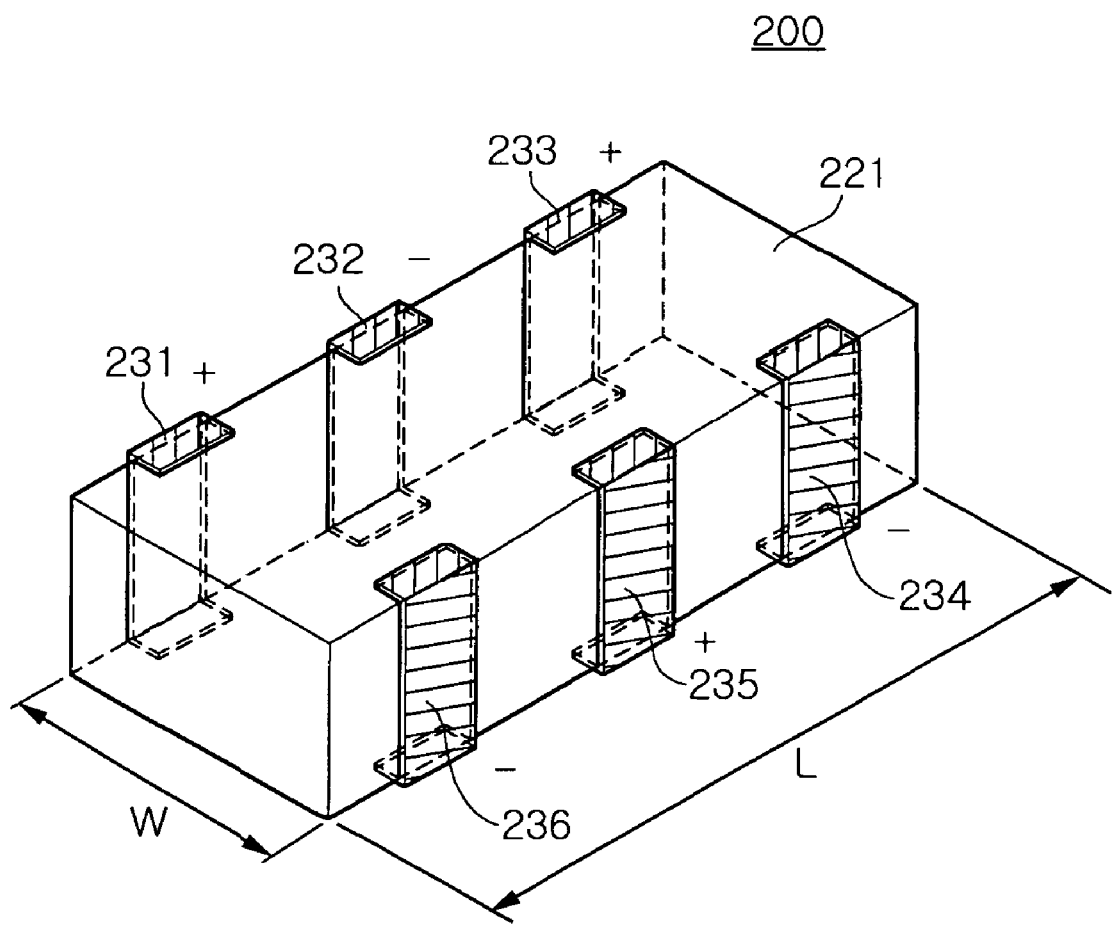
FIG. 5 is a perspective view illustrating a multilayer chip capacitor according to an exemplary embodiment of the invention.
Figure 6:
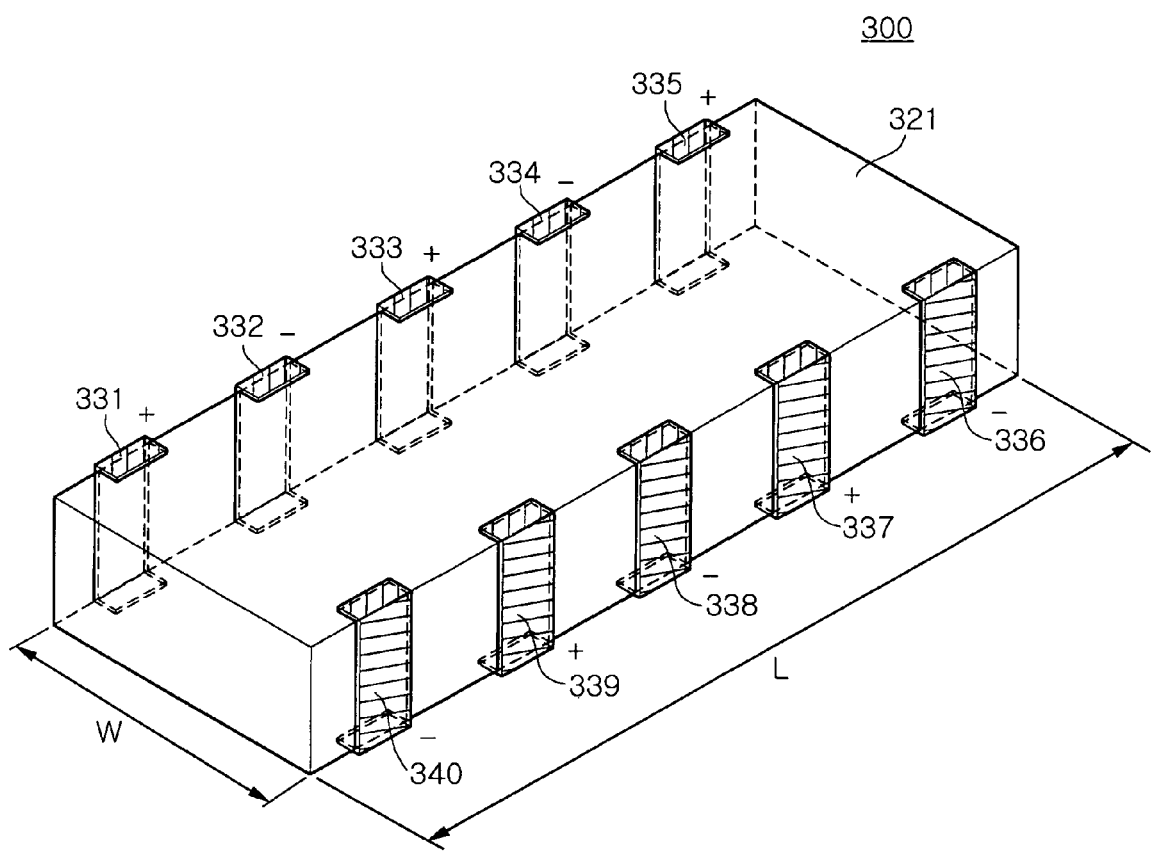
FIG. 6 is a perspective view illustrating a multilayer chip capacitor according to an exemplary embodiment of the invention.

According to the present embodiment described above, an eight-terminal multilayer chip capacitor is adopted but the invention is not limited thereto. As shown in a capacitor 200 of FIG. 5, first and second external electrodes of a different number may be formed on respective longer sides of a capacitor body 221. That is, two plus external electrodes 231 and 233 and one minus external electrode 232 are arranged on one of the longer sides. Meanwhile, one plus external electrode 235 and two minus external electrodes 234 and 236 are arranged on the other longer side. Accordingly, three pairs of plus and minus external electrodes are arranged on the opposing longer sides to constitute a six-terminal capacitor. Also, the present embodiment may be applied to a ten-terminal 300 as shown in FIG. 6. Referring to FIG. 6, reference numeral 321 denotes a capacitor body and reference numerals 331 to 340 denote external electrodes. Moreover, the present embodiment may be applicable to a twelve-terminal capacitor having six external electrodes on each of longer sides. In any case, the capacitor body has a ratio L/W of length to width that is at least 2.5. Such a form factor allows a smaller size in the capacitor and a lower ESL thereof.

As set forth above, according to exemplary embodiments of the invention, a capacitor is reduced not only in size but also in ESL. This allows a greater number of decoupling capacitors to be connected in parallel on a predetermined mounting area of the package. This also further reduces total inductance or total impedance. This consequently stabilizes power circuits of an MPU package more effectively.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer chip capacitor comprising:
   a capacitor body having a plurality of dielectric layers deposited therein and having a parallelepiped shape;
   at least three pairs of first and second external electrodes formed on two longer sides, the first and second external electrodes in each of the pairs having different polarities and opposing each other, and the first and second external electrodes on each of the longer sides arranged alternately with each other; and
   a plurality of first and second internal electrodes arranged alternately to interpose each of the dielectric layers, the first and second internal electrodes connected to the first and second external electrodes by leads, respectively,
   wherein
   the capacitor body has a length that is at least 1.1 mm and up to 1.6 mm and the capacitor body has a width that is at least 0.2 mm and up to 0.5 mm, so that the capacitor body has a length that is at least 3 times and up to 7 times a width thereof.

2. The multilayer chip capacitor of claim 1, wherein the first and second external electrodes of an identical number are formed on the respective longer sides.

3. The multilayer chip capacitor of claim 2, wherein four pairs of first and second external electrodes are formed on the longer sides.

4. The multilayer chip capacitor of claim 1, wherein the first and second electrodes of a different number are formed on the respective longer sides.

5. The multilayer chip capacitor of claim 4, wherein three pairs of first and second external electrodes are formed on the longer sides.

6. A multilayer chip capacitor comprising:
- a capacitor body having a plurality of dielectric layers deposited therein and having a parallelepiped shape;
- at least three pairs of first and second external electrodes formed on two longer sides, the first and second external electrodes in each of the pairs having different polarities and opposing each other, and the first and second external electrodes on each of the longer sides arranged alternately with each other; and
- a plurality of first and second internal electrodes arranged alternately to interpose each of the dielectric layers, the first and second internal electrodes connected to the first and second external electrodes by leads, respectively, wherein the capacitor body has a length that is at least 3 times and up to 7 times a width thereof.

* * * * *